United States Patent [19]
Clark

[11] 3,802,523
[45] Apr. 9, 1974

[54] ANTI-STICTION DEVICE
[75] Inventor: David Keenan Clark, Mount Royal, Quebec, Canada
[73] Assignee: Canadian Marconi Company, Montreal, Quebec, Canada
[22] Filed: Nov. 20, 1972
[21] Appl. No.: 307,822

[52] U.S. Cl. .................. 177/146, 177/1, 177/136, 177/141, 177/208, 73/141 R, 60/23, 60/24, 244/104 FP
[51] Int. Cl. .................. G01g 19/02, G01z 19/52
[58] Field of Search .................. 177/136–141, 177/254; 73/37, 206, 239, 419; 244/104; 165/65, 66, 108; 60/23, 24; 236/245; 122/451.2

[56] References Cited
UNITED STATES PATENTS
3,581,836 6/1971 Segerdahl et al. .............. 177/146 X
3,716,988 2/1973 Wurm .................................. 60/24

*Primary Examiner*—Stephen J. Tomsky
*Assistant Examiner*—Vit W. Miska
*Attorney, Agent, or Firm*—Alan Swabey

[57] ABSTRACT

The invention relates to a system for determining aircraft weight by detecting the static pressure in the oleo struts of the aircraft, and relates specifically to a system for eliminating errors due to variable stiction (static friction) forces in such systems. In accordance with the invention, the pressure of the gas in the oleo chamber, formed by the walls of the oleo cylinder and the top surface of the oleo piston, is varied from a maximum peak level to a minimum peak level. In order to determine aircraft weight, both above values are detected, and the average of these two values is calculated. Aircraft weight is linearly related to this average value so that the aircraft weight is now determinable. Preferably, the pressure is varied by circulating the gas in the oleo chamber through a heater means to thereby heat the gas, and returning the heated gas to the oleo chamber. The heated gas mixes with the unheated gas in the chamber to raise the temperature of the gas in the chamber and to thereby raise the pressure of the gas in the chamber. After some time, the circulator is stopped, and the gas in the chamber will lose heat to the chamber walls so that the temperature, and correspondingly the pressure, of the gas in the chamber is decreased. Preferably again, the ON-OFF timing of the circulator is automatically controlled.

21 Claims, 6 Drawing Figures

ANTI-STICTION DEVICE

FIELD OF THE INVENTION

This invention relates to weight and balance system for measuring the weight of an aircraft, which system is integral with the aircraft. More specifically, this invention is related to a weight and balance system for measuring the weight of an aircraft wherein the static pressure in the oleo struts is detected by pressure transducers mounted in the oleo struts.

BACKGROUND OF THE INVENTION

1. State of the Prior Art

Systems for determining aircraft weight by sensing the static pressure in the oleo struts are well known in the art as can be seen in Canadian Pat. No. 863,763, issued Feb. 16, 1971, Erwin H. Hartel, inventor. U.S. Pat. No. 3,214,116, issued Oct. 26, 1965, R. Utting, inventor, is further illustrative of the state of the art having regard to oleo struts.

It is well known that the static pressure in a strut is a linear function of the weight supported by the strut. In order to determine this weight, it is merely necessary to measure the static pressure and to multiply this pressure by the piston area. The total weight of the aircraft is, of course, the sum of the weights supported by all the struts.

In such systems, the variable stiction (static friction) force will introduce variable and unpredictable errors, and one of the systems known by the applicant make allowances for these errors.

2. State of the Invention

It is a feature of the invention to provide a system as above described wherein the variable stiction force error is eliminated.

It is a further feature of the invention to provide such an improved system which does not require the use of hydraulic pumps, reservoirs, solenoid valves or dynamic seals.

The invention comprises an oleo strut for an aircraft, said oleo strut comprising: a cylinder and piston arrangement defining a chamber within said cylinder; a gaseous substance in said chamber; means for varying the pressure of said gaseous substance between a maximum and a minimum level; and means for detecting said maximum and minimum levels.

In accordance with the invention, a system for determining the force of an aircraft at an oleo strut thereof; said oleo strut comprising a cylinder comprising a vertical wall with an internal surface and a top wall with an internal surface; said oleo strut further comprising a piston, having a top surface, in said cylinder; said piston being in sliding engagement with said internal surface of said vertical wall and said top wall of said cylinder and the top surface of the piston; said chamber comprising a gaseous substance; said piston being movable in said cylinder to thereby vary the volume of said chamber; comprises the improvement of means for varying the pressure of said gaseous substance to a maximum and a minimum level; and means for detecting said maximum and minimum pressure levels.

Preferably the means for varying the pressure of said gaseous substance comprises means for cylically heating said gaseous substance.

BRIEF DESCRIPTION OF THE DRAWINGS

The invention will be better understood by an examination of the following description together with the accompanying drawings, in which.

DETAILED DESCRIPTION OF THE DRAWINGS

Figure 1:
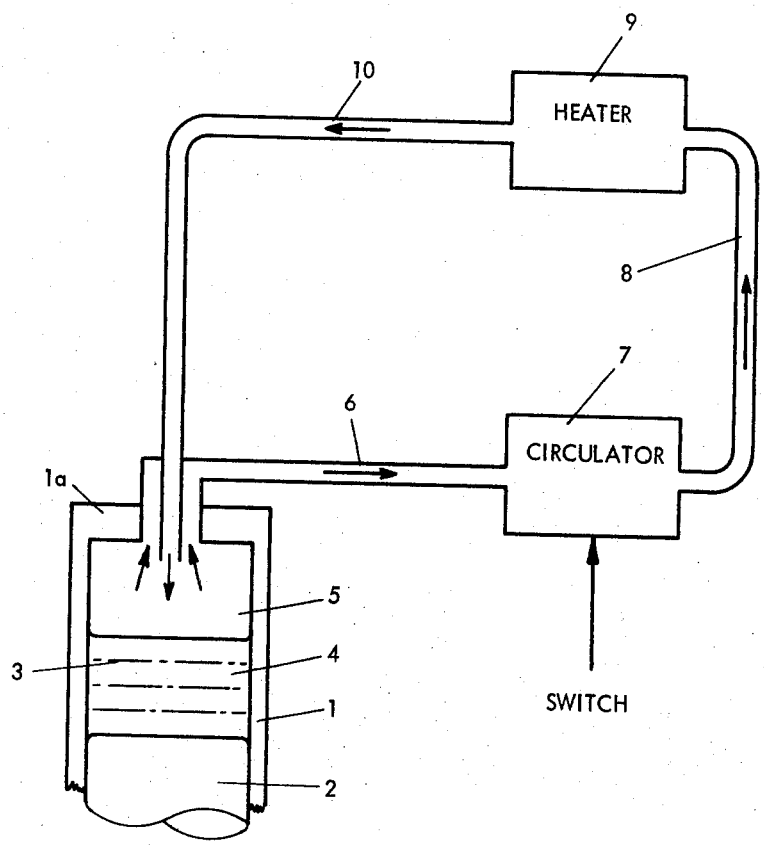
FIG. 1 is a block diagram of a system in accordance with the invention.

Referring to FIG. 1, 1 is a cylinder of an aircraft oleo strut and 2 is a piston which is slidable within the cylinder. The cylinder may be the main suspension leg to be attached to the airframe while the piston will be attached to the wheels of the aircraft. Although not shown in the drawing, it is well known that the piston may be supported and guided in the cylinder by bearing means as illustrated in, for example, the above-identified Canadian Pat. No. 863,763. In addition, the piston may be sealed relative to the cylinder as also illustrated in the Canadian patent.

A chamber 3 is enclosed by the piston, the cylinder walls and the end of the cylinder 1a. The chamber contains a hydraulic fluid 4, such as oil, topped by a gas 5, such as air or nitrogen. In order to determine the weight of the aircraft at the point of the landing gear, the pressure of the gas in the chamber is sensed.

The cool gas is drawn from the chamber 3 into the line 6 by the circulator 7 in the direction as shown by the arrows. The gas is then forced, through the line 8, to the heater 9 where the gas is heated. The heated gas then continues through line 10 and back into the chamber 5. The heated gas mixes with the cool gas in the chamber to raise the temperature of the gas in the chamber. The pressure of the gas thus increases. The circulator is preferably timed to operate for a fixed period of time and then to automatically shut off for a second fixed period of time before it is automatically turned on again for the same first fixed period of time. Preferably, the circulator is turned on long enough to ensure a visible change in gas pressure.

Figure 2:
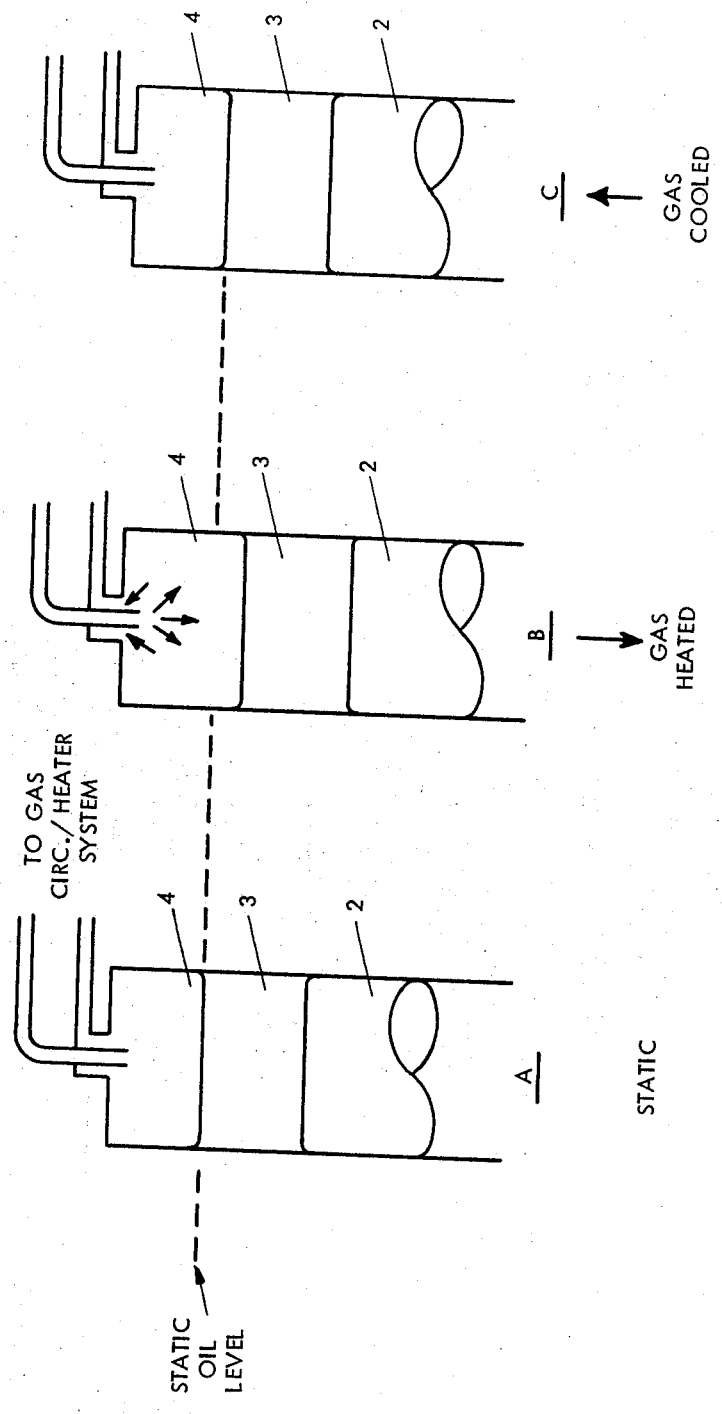
FIGS. 2A to 2C illustrate the different positions of the piston under different temperature conditions to better understand the operation of the inventive system.

FIG. 2 shows the position of the piston and oil level before the gas is heated, after the gas is heated, and after the gas has cooled off again. In FIG. 2A, the oil is at the static oil level, shown for comparison of FIGS. 2A, 2B and 2C by the dotted line. After the gas is heated, the gas pressure will increase and force the oil level and piston in the downward direction as illustrated by the arrow in FIG. 2B. Thus, in FIG. 2B, the oil level is below the static oil level of FIG. 2A.

When the gas is fully cooled off again, after the circulator has been turned off, the piston and oil will rise in the direction of the arrow in FIG. 2C, and the oil will return to the original static oil level.

Figure 3:
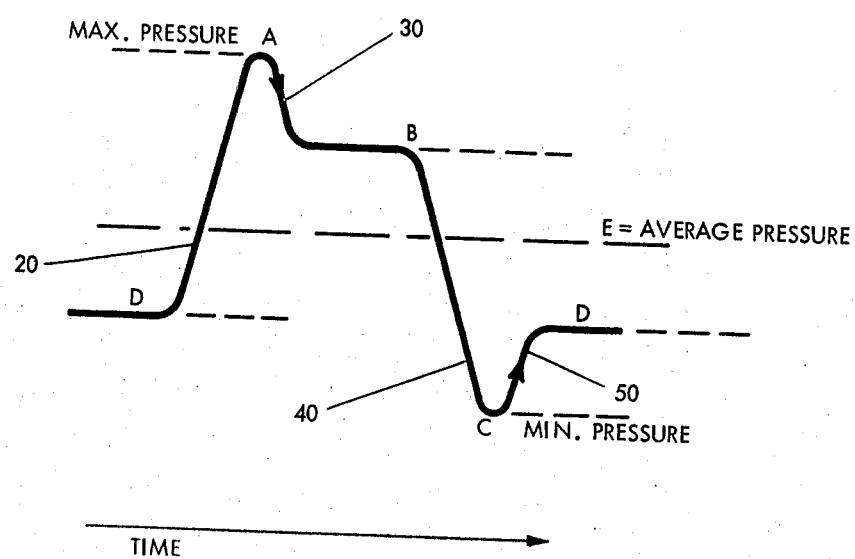
FIG. 3 is a graph of oleo pressure vs. time to aid in explaining the invention.

FIG. 3 illustrates the pressure variations over a cycle as above described. As the temperature of the gas in the chamber increases, the pressure of the gas increases up to a maximum peak value A. As the pressure increases, the piston and oil will move in the downward direction until the temperature in the gas stops increasing. This will, of course, happen when the circulator is turned off, as explained above. At this point, there will be a sharp pressure drop along the slope 30 to the level B. The B level is the steady state level at the increased temperature.

The gas will remain at the B pressure level for some time. However, when the gas in the chamber stops receiving heat from the heater, it also starts to lose heat to the chamber walls and to the fluid in the chamber. As the temperature of the gas starts to decrease because of this loss of heat from the gas, the pressure of the gas will also decrease along the slope 40 in FIG. 3. Correspondingly, the piston and the oil will move upward to assume its initial position.

The pressure will decrease to some minimum value C at which time the piston will have reached its initial position. The pressure will then rise to the level D along the slope 50 where it will remain until the circulator is again turned on to circulate heated gas through the chamber.

The average pressure in the chamber over the cycle is represented in FIG. 3 by the level E. Numerically, this level can be calculated by the formula:

$$E = (A + C)/2 \qquad 1$$

The stiction force error is eliminated as it is the maximum and minimum peak pressures $A$ and $C$ respectively which are sensed. The average value $E$ is then calculated and used for the purpose of determining the aircraft force $W$ (weight) exerted at that strut using the formula:

$F$ = aircraft weight acting on oleo strut = $E \times$ (oleo piston area) \qquad 2

It is also possible to calculate the percentage of stiction using the formula:

Maximum percent stiction = $(A - E)/E \times 100$ percent \qquad (3)

Figure 4:
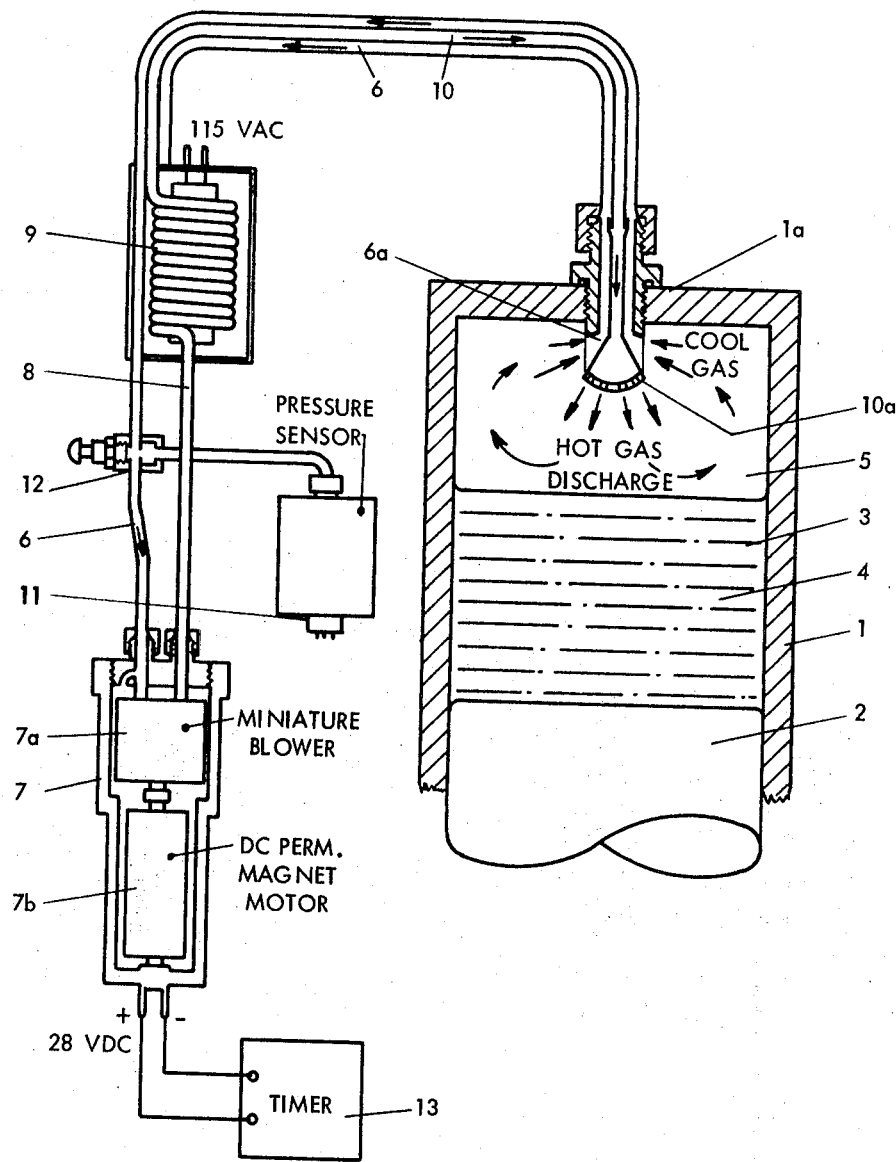
FIG. 4 illustrates one embodiment of the invention.

FIG. 4 is an illustration of a laboratory model used to demonstrate the operation of the system. The cylinder walls 1 and 1a, together with the piston 2, again define the chamber 3. The line 6 comprises an annular cool gas inlet 6a at the chamber end thereof. The line 6 is in communication with the circulator 7 through the charging valve receptacle 12. The charging valve receptacle is a tee-junction which pneumatically connects an air-charge valve and pressure sensor 11 to the chamber 3 without subjecting these components to excessive heat. The pressure sensor can comprise any pressure sensor as well known in the art.

The circulator consists of a miniature DC permanent magnet motor rated at 1/20 HP, 5 in. oz. torque, 8,000 RPM, identified in the figure as 7b, coupled with a miniature carbon-vane compressor rated at 0.67 C.F.M., 10 psig, identified in the figure as 7a. The assembly is housed in a steel pressure vessel to eliminate dynamic seals, and electric current for the motor is fed in through hermetically sealed feed-through terminals. The inlet and outlet of the circulator are fitted with 3/16 inch × 37½° tube flare fittings. A timing device 13 is provided to the 28 VDC terminals to control the on-off cycle of the circulator. The timing device provides a 15 sec. ON, 45 sec. OFF cycle.

The outlet of the circulator is led, via line 8, to the heater 9. The heater comprises a heat exchanger consisting of a 10 foot length of metal tubing such as ¼ inch copper tubing wound around a copper cylinder core which contains three 150 watt cartridge heaters electrically connected in series with an integral thermostat rated at 10 amps, 115 VAC and set at 460°F.

The heater is in communication with the chamber via the line 10 which is internal to and co-axial with line 6. The line 10 is terminated by a flared outlet 10a at the chamber end thereof. The outlet is preferably provided with ½-20 UNC threads to fit any oleo charging unit.

In operation, the embodiments work as follows: 115 VAC power is fed to the heat exchanger so that it reaches 460°F. Thermostatic action will maintain the heat exchanger at this temperature. The circulator is turned on by the action of the timing device for a period of 15 seconds. During the ON period, the gas 5 is circulated through the heat exchanger. Gas from the chamber is drawn up through the cool gas inlet 6a, through the line 6 to the circulator, and thence through line 8, to the heat exchanger 9. The gas is heated by the heat exchanger and then continues, through line 10, and, out of the flared outlet 10a, into the chamber 3. The direction of the gas flow in the chamber is indicated by the arrows in the chamber. Because of its large surface area, the heat exchanger very rapidly heats up the gas passing through it.

As the gas in the chamber is moving at a very low velocity, the rate of heat transfer to the chamber walls is initially much lower than the rate of heat transfer from the heat exchanger to the gas. As a result, the temperature of the gas in the chamber increases until the thermal gradient between the gases is sufficiently high to equalize the thermal transfer rates, and gas temperature stabilizes, usually within 30 seconds, at a temperature significantly higher than that of the chamber walls. This temperature change corresponds to a static pressure increase which is sufficient to cause the cylinder to move upward a short distance.

The circulator is then automatically switched off by the timing device. As the gas no longer circulates, the gas in the chamber will no longer receive thermal energy from the heat exchanger, so that the gas temperature in the chamber will decrease until it approaches the temperature of the chamber walls. This temperature decrease corresponds to a static pressure decrease which is sufficient to cause the cylinder to move a short distance downward.

Although it has been previously stated that the cylinder should return to its initial position, after the chamber gas has cooled down, it is not necessary that such alignment take place for the operation of the invention. In fact, it is not necessary that the cylinder move at all in any part of the cycle. It is only necessary that the pressure in the chamber be increased and decreased to appropriate maximum and minimum values. It can thus be seen that the 15 sec. ON-45 sec. OFF cycle is not necessary, but merely preferable. Automatic funtioning of the timing device is, nevertheless, preferred.

Although it has only been considered to vary the pressure by varying the temperature of the gas in the oleo chamber, it will be clear to one skilled in the art that other means, for example mechanical means, could be used to so vary the pressure.

While a specific embodiment has been described above, this was for the purpose of illustrating, but not limiting the invention. Various modifications, which will come readily to the mind of one skilled in the art, are within the scope of the invention as defined in the appended claims.

I claim:

1. An oleo strut for an aircraft, said oleo strut comprising; a cylinder and piston arrangement defining a chamber within said cylinder; a gaseous substance in said chamber; means for varying the pressure of said gaseous substance between a maximum peak and a minimum peak level; and means for detecting said maximum peak and minimum peak levels, wherein the means for varying the pressure of said gaseous substance comprises means for cyclically heating said substance.

2. A system as defined in claim 1, wherein said means for heating said gaseous substance comprises a heater means; said system further comprising circulator means; and pipe means for carrying said gaseous substance from said chamber to said heater means and back to said chamber by the action of said circulator means, to thereby provide heated gas to said chamber.

3. A system as defined in claim 1 wherein said means for heating said gaseous substance comprises a heater means; and further comprising a circulator means; first pipe means connecting said chamber to said circulator means; second pipe means connecting the circulator means to said heater means; and third pipe means connecting the heater means to said chamber means; whereby, when the circulator is on, it will draw the gaseous substance from the chamber, through the circulator, to the heater and back to the chamber to thereby provide heated gas to said chamber.

4. A system as defined in claim 1, wherein said means for heating said gaseous substance comprises a heater means; said system further comprising circulator means adapted to be automatically turned on and off by a timing device; and pipe means for carrying said gaseous substance from said chamber to said heater means and back to said chamber by the action of said circulator means, to thereby provide heated gas to said chamber.

5. A system as defined in claim 1 wherein said means for heating said gaseous substance comprises a heater means; said system further comprising circulator means adapted to be automatically turned on and off by a timing device; first pipe means connecting said chamber to said circulator means; second pipe means connecting the circulator means o said heater means; and third pipe means connecting the heater means to said chamber means; whereby, when the circulator is on, it will draw the gaseous substance from the chamber, through the circulator, to the heater and back to the chamber to thereby provide heated gas to said chamber.

6. A system as defined in claim 1, wherein said means for heating said gaseous substance comprises a heater means; said system further comprising circulator means, said circulator means comprising a miniature blower driven by a miniature motor, both the blower and the motor being housed in a steel pressure vessel; and pipe means for carrying said gaseous substance from said chamber to said heater means and back to said chamber by the action of said circulator means, to thereby provide heated gas to said chamber.

7. A system as defined in claim 1 wherein said means for heating said gaseous substance comprises a heater means; said system further comprising circulator means, said circulator means comprising a miniature blower driven by a miniature motor, both the blower and the motor being housed in a steel pressure vessel; first pipe means connecting said chamber to said circulator means; second pipe means connecting the circulator means to said heater means; and third pipe means connecting the heater means to said chamber means; whereby, when the circulator is on, it will draw the gaseous substance from the chamber, through the circulator, to the heater and back to the chamber to thereby provide heated gas to said chamber.

8. A system as defined in claim 1 wherein said means for heating said gaseous substance is a heat exchange which comprises a coil of metal tubing to provide a large heating surface area, said tubing being wound around a copper core which surrounds at least one electrical heating element.

9. A system as defined in claim 1 and comprising a hydraulic fluid in said chamber adjacent the top surface of said piston.

10. A system as defined in claim 1 wheren said means for heating said gaseous substance comprises a heater means; and further comprising a circulator means; first pipe means connecting said chamber to said circulator means; second pipe means connecting the circulator means to said heater means; and third pipe means connecting the heater means to said chamber means; said third pipe means being internal to and in axial alignment with said first pipe means; whereby, when the circulator is on, it will draw the gaseous substance from the chamber, through the circulator, to the heater and back to the chamber to thereby provide heated gas to said chamber.

11. A system for determining the force of an aircraft at an oleo strut thereof; said oleo strut comprising a cylinder comprising a vertical wall with an internal surface and a top wall with an internal surface; said oleo strut further comprising a piston, having a top surface, in said cylinder; said piston being in sliding engagement with said internal surface of said vertical wall; a chamber defined by the internal surfaces of said vertical wall and said top wall of said cylinder and the top surface of the piston; said chamber comprising a gaseous substance; said piston being movable in said cylinder to thereby vary the volume of said chamber; the improvement comprising means for varying the pressure of said gaseous substance to a maximum peak and a minimum peak level; and means for detecting said maximum peak and minimum peak pressure levels, wherein the means for varying the pressure of said gaseous substance comprises means for cyclically heating said gaseous substance.

12. A system as defined in claim 2, wherein said means for heating said gaseous substance comprises a heater means; said system further comprising circulator means; and pipe means for carrying said gaseous substance from said chamber to said heater means and back to said chamber by the action of said circulator means, to thereby provide heated gas to said chamber.

13. A system as defined in claim 2 wherein said means for heating said gaseous substance comprises a heater means; and further comprising a circulator means; first pipe means connecting said chamber to said circulator means; second pipe means connecting the circulator means to said heater means; and third pipe means connecting the heater means to said chamber means; whereby, when the circulator is on, it will draw the gaseous substance from the chamber, through the circulator, to the heater and back to the chamber to thereby provide heated gas to said chamber.

14. A system as defined in claim 2, wherein said means for heating said gaseous substance comprises a heater means; said system further comprising circulator means adapted to be automatically turned on and off by a timing device; and pipe means for carrying said gaseous substance from said chamber to said heater means and back to said chamber by the action of said circulator means, to thereby provide heated gas to said chamber.

15. A system as defined in claim 2 wherein said means for heating said gaseous substance comprises a heater means; said system further comprising circulator means adapted to be automatically turned on and off by a timing device; first pipe means connecting said chamber to said circulator means; second pipe means connecting the circulator means to said heater means; and third pipe means connecting the heater means to said chamber means; whereby, when the circulator is on, it will draw the gaseous substance from the chamber, through the circulator, to the heater and back to the chamber to thereby provide heated gas to said chamber.

16. A system as defined in claim 2, wherein said means for heating said gaseous substance comprises a heater means; said system further comprising circulator means, said circulator means comprising a miniature blower driven by a miniature motor, both the blower and the motor being housed in a steel pressure vessel; and pipe means for carrying said gaseous substance from said chamber to said heater means and back to said chamber by the action of said circulator means, to thereby provide heated gas to said chamber.

17. A system as defined in claim 2 wherein said means for heating said gaseous substance comprises a heater means; said system further comprising circulator means, said circulator means comprising a miniature blower driven by a miniature motor, both the blower and the motor being housed in a steel pressure vessel; first pipe means connecting said chamber to said circulator means; second pipe means connecting the circulator means to said heater means; and third pipe means connecting the heater means to said chamber means; whereby, when the circulator is on, it will draw the gaseous substance from the chamber, through the circulator, to the heater and back to the chamber to thereby provide heated gas to said chamber.

18. A system as defined in claim 2 wherein said means for heating said gaseous substance is a heat exchanger which comprises a coil of metal tubing to provide a large heating surface area, said tubing being wound around a copper core which surrounds at least one electrical heating element.

19. A system as defined in claim 2 and comprising a hydraulic fluid in said chamber adjacent the top surface of said piston.

20. A system as defined in claim 2 wherein said means for heating said gaseous substance comprises a heater means; and further comprising a circulator means; first pipe means connecting said chamber to said circulator means; second pipe means connecting the circulator means to said heater means; and third pipe means connecting the heater means to said chamber means; said third pipe means being internal to and in axial alignment with said first pipe means; whereby, when the circulator is on, it will draw the gaseous substance from the chamber, through the circulator, to the heater and back to the chamber to thereby provide heated gas to said chamber.

21. A system as defined in claim 2, wherein said aircraft comprises an airframe and wheels; said cylinder comprising a main suspension leg attached to said airframe and said piston being attached to a wheel of the aircraft.

* * * * *